United States Patent [19]

Rodish

[11] 4,182,799

[45] Jan. 8, 1980

[54] FLAME-RETARDANT ADDITIVE FOR FOAMED POLYSTYRENE

[76] Inventor: John Rodish, 1720 Highland Pike, Fort Wright, Ky. 41011

[21] Appl. No.: 914,001

[22] Filed: Jun. 9, 1978

[51] Int. Cl.² ............................. C08J 9/00; C08J 9/14; C09K 3/28
[52] U.S. Cl. .......................................... 521/98; 252/8.1; 521/79; 521/85; 521/92; 521/97; 521/146; 521/907; 264/50; 264/211; 264/DIG. 5
[58] Field of Search ...................... 521/907, 79, 85, 92, 521/146, 98; 252/8.1

[56] References Cited

U.S. PATENT DOCUMENTS

| | | | |
|---|---|---|---|
| 2,611,694 | 9/1952 | Becker | 252/8.1 |
| 2,676,927 | 4/1954 | McCurdy et al. | 260/2.5 |
| 3,635,850 | 1/1972 | Birkner et al. | 521/98 |
| 3,639,299 | 2/1972 | McDowall | 260/2.5 FP |
| 3,874,889 | 4/1975 | Geppert et al. | 260/2.5 FP |

*Primary Examiner*—H. S. Cockeram
*Attorney, Agent, or Firm*—Hauke and Patalidis

[57] ABSTRACT

A flame-retarding additive for foamed polystyrene is composed of 40 to 56 weight percent of halogenated hydrocarbon, 9 to 15 weight percent of antimony oxide, 14 to 22 weight percent of zinc borate, and 16 to 28 weight percent of hydrated alumina.

12 Claims, No Drawings

FLAME-RETARDANT ADDITIVE FOR FOAMED POLYSTRENE

BACKGROUND OF THE INVENTION

Polystyrene foam is a material which is widely used as a highly protective and light-weight shipping container and as a low-cost material providing good thermal insulation in various types of panels used in the construction and appliance industries.

Foamed polystyrene is produced using styrene polymer crystals which are run through an extrusion apparatus. In general, the extrusion apparatus consists of a melt section to which the crystals are introduced and raised to a melt temperature of about 425° F. and a number of pumping sections or stages to which the melt is passed. Some of the pumping sections are equipped to introduce additive materials to the melt during its passage therethrough. During passage through the final pumping sections prior to passage through the forming or shaping head a blowing agent, such as carbon dioxide, is introduced in sufficient quantity to impart the desired density to the final product. During passage through the various pumping sections the material is cooled to the optimum extrusion temperature—usually about 350° F.

Foamed polystyrene burns readily. This property is not considered a disadvantage where it is used as a packaging material. However, where it is used as thermal insulation in a construction panel or in an appliance such as a refrigerator its combustion properties are very objectionable. Conventional flame-retardant additives which have been used in the past have contained halogenated hydrocarbons, antimony oxide, zinc borate and talc. The present invention is directed to the production of a new and improved polystyrene foam which is flame-retardant.

SUMMARY OF THE INVENTION

The invention is directed particularly to a flame-retarding additive for foamed polystyrene which is introduced to the polystyrene during its passage through an extruder. The additive is composed of 40 to 56 percent by weight of halogenated hydrocarbon, 9 to 15 percent by weight of antimony oxide, 14 to 22 percent by weight of zinc borate, and 16 to 28 percent by weight of hydrated alumina. This additive is present to the extent of about 10 to 20 percent by weight of the polystyrene.

DESCRIPTION OF THE PREFERRED EMBODIMENTS

The flame-retardant additive of this invention is distinguished by the presence of a monohydrate or trihydrate of alumina and the absence of talc. Halogenated hydrocarbons are present in the range of 40 to 56 percent by weight. Chlorinated waxes are examples of relatively inexpensive hydrocarbon materials which may be used. Bromo-aliphatic hydrocarbons, although more costly than chloro-aliphatic materials, provide very good flame-retardant characteristics.

Antimony oxide, $Sb_2O_3$, is present to the extent of 9 to 15 percent by weight of the additive. Zinc borate, $3ZnO.2B_2O_3$, is present to the extent of 14 to 22 percent by weight. Both antimony oxide and zinc borate provide synergistic action on the inhibition of flame when combined with halogen-containing materials.

Hydrated alumina, $Al_2O_3.H_2O$ or $Al_2O_3.3H_2O$, is present in the additive to the extent of 16 to 28 percent by weight. This component serves as a smoke depressant in the additive by virtue of the fact that when the alumina is heated the water of hydration is released as vapor which serves as a smoke depressant. Hydrated alumina also serves to restrict access of the polystyrene foam to oxygen.

The halogenated hydrocarbon, antimony oxide, zinc borate and hydrated alumina set forth above are the active ingredients of the flame-retardant of this invention. If some of these components are present on the upper side of the weight percentage ranges given above, the weight percentages of others will have to be reduced correspondingly. Other components may be present and their presence will reduce the weight percentages listed above correspondingly. Those components of the additive which are commercially available as powders should have a particle size preferably of about 15 micrometers in order to promote rapid mixing and uniform dispersion throughout the polymer. However, larger particle sizes do not prevent the additive from serving as a satisfactory flame-retardant and a size range containing some particles as large as 100 micrometers in diameter will still perform satisfactorily.

A preferred composition within the weight ranges described above consists of 48 percent by weight of halogenated hydrocarbon; 12 percent by weight of antimony oxide; 18 percent by weight of zinc borate; and 22 percent by weight of hydrated alumina. The trihydrate of alumina is preferred to the monohydrate as it releases greater quantities of water vapor and consequently is slightly better as a smoke depressant. Among satisfactory halogenated hydrocarbons is Dechlorane 604 available from the Hooker Chemicals Division of Occidental Petroleum Corp. A satisfactory antimony oxide is Thermoguard S-711 of M & T Chemicals Corp.; zinc borate is available from Humphrey Chemical Corp.; and hydrated alumina is available from Aluminum Corporation of America.

The additive described above is introduced to the melt section of an extruder processing polystyrene at a sufficient rate for the additive to constitute 10 to 20 percent by weight of the polystyrene. Preferably, the additive constitutes about 14 percent by weight of the polystyrene.

A standard extrusion apparatus may be used in producing the flame-retardant foamed polystyrene of this invention. After the additive has been introduced to the polystyrene as described above the melt is passed through a series of pumping sections during which further mixing and cool-down take place. At the last two pumping sections blowing agents in the ratio of about 20 pounds of resin to 1 pound of blowing agent are introduced. These blowing agents are non-combustible materials which are gases at room temperature. Typical agents are nitrogen, carbon dioxide, Freon F-11, ($CCl_3F$), Freon F-12 ($CCl_2F_2$), and similar materials. Sodium bicarbonate, while not a gas at room temperature, gives off $CO_2$ at the extrusion temperature and therefore may be used as a blowing agent.

While the additive of the present invention is somewhat more costly than flame-retardant additives containing talc instead of hydrated alumina, the present additive produces an improved result. The foam may be extruded at a lower temperature, for example, 300° F. instead of 350° F. In addition to serving as a smoke depressant, the additive of the present invention produces egg-shaped foamed cells having higher strength in compression. Hydrated alumina serves as a nucleating agent in the production of such cells.

The flame-retardant polystyrene foam of the present invention is particularly useful as thermal insulation in construction panels. It is also useful as a low-cost flame-resistant insulation in appliances such as refrigerators.

While the invention has been described with reference to a particular embodiment, it is obvious that there may be variations in composition which properly fall within the scope of the invention. Accordingly, the invention should be limited only as may be necessitated by the scope of the appended claims.

I claim:

1. A flame-retarding additive for foamed polystyrene comprising 40 to 56 weight percent of halogenated hydrocarbon, 9 to 15 weight percent of antimony oxide, 14 to 22 weight percent of zinc borate, and 16 to 23 weight percent of alumina hydrate.

2. A flame-retarding additive as claimed in claim 1 in which the alumina hydrate is $Al_2O_3.3H_2O$.

3. A flame-retarding additive as claimed in claim 1 in which the alumina hydrate is $Al_2O_3.H_2O$.

4. A flame-retarding additive as claimed in claim 1 in which the composition is about 48 weight percent of halogenated hydrocarbon, 12 weight percent of antimony oxide, 18 weight percent of zinc borate, and 22 weight percent of alumina hydrate.

5. A flame-retarding additive as claimed in claim 4 in which the alumina hydrate is $Al_2O_3.3H_2O$.

6. A flame-retarding additive as claimed in claim 4 in which the alumina hydrate is $Al_2O_3.H_2O$.

7. A light-weight flame-retarding organic polymer shape comprising a foamed polystyrene extrusion having uniformly dispersed therein an additive composed of 40 to 56 percent by weight of halogenated hydrocarbon, 9 to 15 percent by weight of antimony oxide, 14 to 22 percent by weight of zinc borate, and 16 to 28 percent by weight of alumina hydrate.

8. A polymer shape as claimed in claim 7 in which the alumina hydrate is $Al_2O_3.3H_2O$.

9. A polymer shape as claimed in claim 7 in which the alumina hydrate is $Al_2O_3.H_2O$.

10. A polymer shape as claimed in claim 7 in which the extrusion consists of 10 to 20 percent by weight of additive material.

11. A polymer shape as claimed in claim 10 in which the extrusion consists of about 14 percent by weight of additive material.

12. A polymer shape as claimed in claim 7 in which the extrusion has a density of less than four pounds per cubic foot.

* * * * *

UNITED STATES PATENT AND TRADEMARK OFFICE
CERTIFICATE OF CORRECTION

PATENT NO. : 4,182,799
DATED : January 8, 1980
INVENTOR(S) : John Rodish

It is certified that error appears in the above-identified patent and that said Letters Patent are hereby corrected as shown below:

Assignee should appear as -- JWB Enterprises, Belleville, Michigan --.

Signed and Sealed this

Fifteenth Day of April 1980

[SEAL]

Attest:

SIDNEY A. DIAMOND

Attesting Officer

Commissioner of Patents and Trademarks